United States Patent [19]

Bloomfield et al.

[11] Patent Number: 5,425,140

[45] Date of Patent: Jun. 13, 1995

[54] METHOD AND APPARATUS FOR PROVIDING CONDITIONAL CASCADING IN A COMPUTER SYSTEM GRAPHICAL USER INTERFACE

[75] Inventors: Marc A. Bloomfield, Lighthouse Point; Scott A. Kliger, Boynton Beach, both of Fla.

[73] Assignee: International Business Machines Corporation, Armonk, N.Y.

[21] Appl. No.: 854,171

[22] Filed: Mar. 20, 1992

[51] Int. Cl.6 .............................................. G06F 3/03
[52] U.S. Cl. ..................................... 395/156; 345/146
[58] Field of Search ............... 395/156, 157, 158, 161; 345/146

[56] References Cited

U.S. PATENT DOCUMENTS 5,276,795  1/1994  Hoeber et al. ...................... 395/156
5,345,550  9/1994  Bloomfield ......................... 395/156

OTHER PUBLICATIONS

Wordperfect for Windows (Trademark of Wordperfect Corporation), 1991, pp. 1-13.

Primary Examiner—Mark K. Zimmerman
Assistant Examiner—Cliff N. Vo
Attorney, Agent, or Firm—Bruce D. Jobse; Mark Kahler; Andrew J. Dillon

[57] ABSTRACT

A computer system and method of operation thereof are provided including an improved graphical user interface (GUI). A conditional cascading menuing method and apparatus which shield novice users from being overwhelmed by advanced operations in the desktop which appears on the user's computer screen. The conditional cascading feature provides the user with the ability to select a basic function or action from a main menu on the desktop, in which case the default behavior of the function will be performed, or to conditionally display, by pressing a mini push-button next to the main menu item text, a submenu of all forms of function or action. The default submenu behavior or item is indicated by a checkmark adjacent the default item in the submenu. Each time the user selects a submenu item which is different from the default submenu item, the presently selected submenu item becomes the default item or behavior.

6 Claims, 9 Drawing Sheets

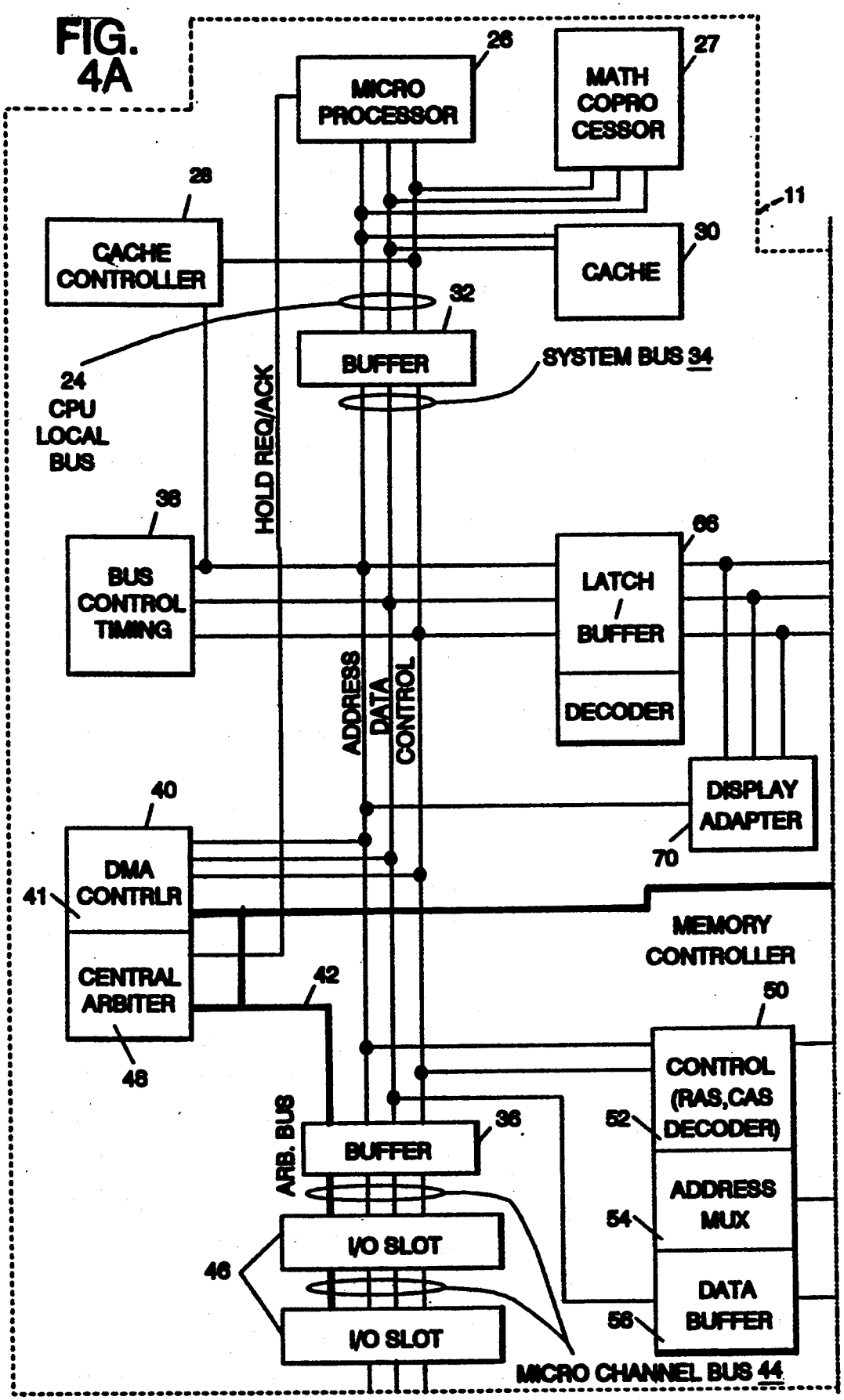

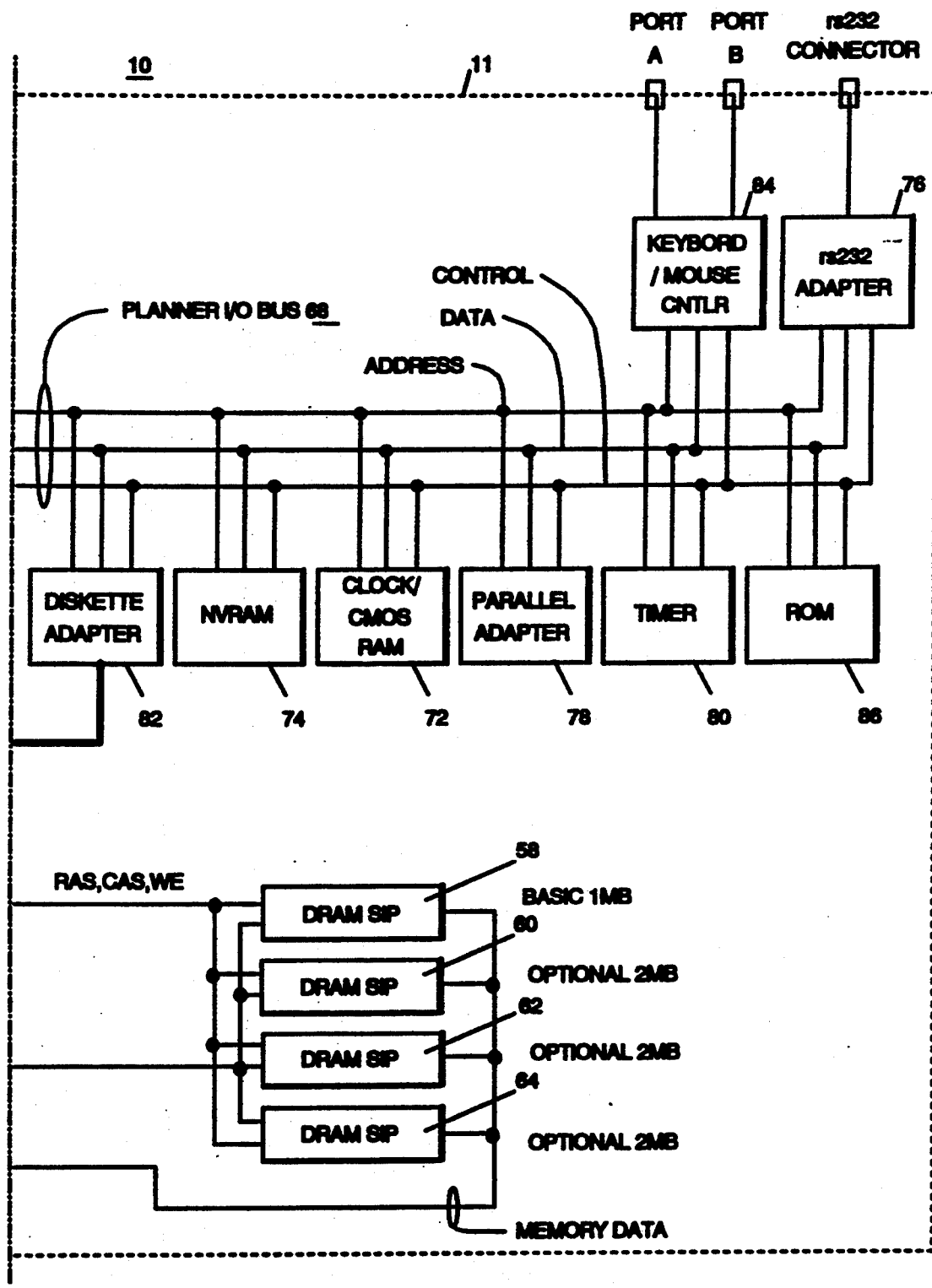

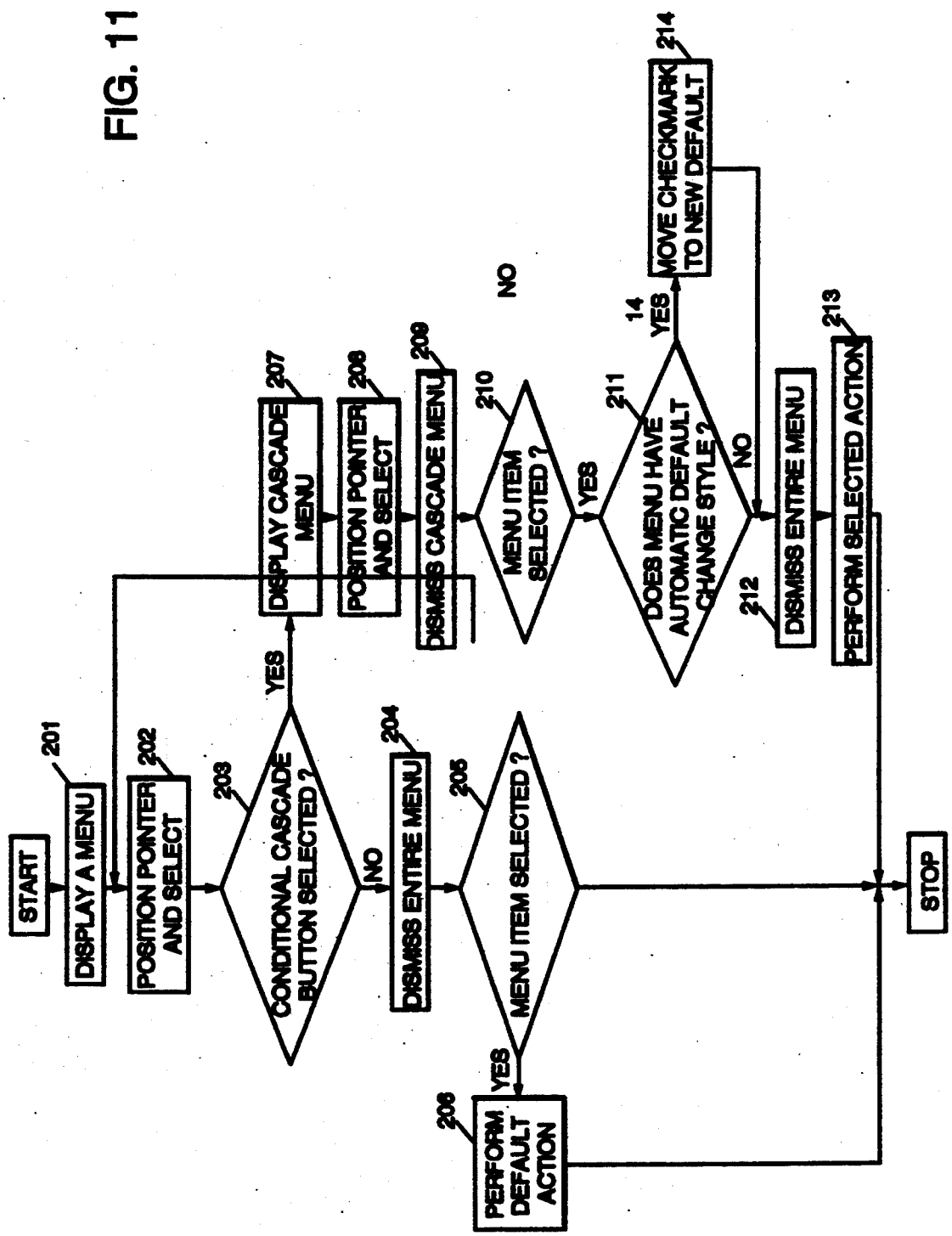

METHOD AND APPARATUS FOR PROVIDING CONDITIONAL CASCADING IN A COMPUTER SYSTEM GRAPHICAL USER INTERFACE

CROSS-REFERENCE TO RELATED APPLICATIONS

The present patent application is one of a group of copending applications which concern the same overall personal computer system but which individually claim different inventive concepts embodied in such personal computer system. These related patent applications were filed on the same date, namely Mar. 20, 1992, are specifically incorporated by reference herein, and are more particularly described as follows:

(1) application Ser. No. 07/854,257, filed Mar. 20, 1992, entitled "Method for Providing Size Adjustment for a Maximized Window in a Computer System Graphical User Interface", the inventor being Bloomfield; and (2) application Ser. No. 07/855,366, filed Mar. 20, 1992, now abandoned, entitled "Method for Providing a Readily Distinguishable Template and Means of Duplication Thereof in a Computer System Graphical User Interface", the inventors being Bloomfield et al, and (3) application Ser. No. 07/855,369, filed Mar. 20, 1992, now U.S. Pat No. 5,371,844, entitled "Palette Manager In A Graphical User Interface Computer System", the inventors being Bloomfield et al.

FIELD OF THE INVENTION

This invention relates to personal computer systems and in particular to a method and device for improving a graphical user interface (GUI) on a personal computer system.

BACKGROUND DISCUSSION

Personal computer systems in general and IBM personal computers in particular have attained widespread use for providing computer power to many segments of today's modern society. Personal computer systems can usually be defined as a desktop, floor standing, or portable microcomputer that consists of a system unit having a single system processor, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses.

Examples of such personal computer systems are IBM's PERSONAL COMPUTER AT, IBM's PERSONAL SYSTEM/2 Models 25, 30, 35, 40 SX, 55 SX, 57 SX, 70, 80, 90 and 95, and IBM PERSONAL SYSTEM/1 computers. These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 55 SX through 95. Beginning with the earliest personal computer system of the Family I models, such as the IBM Personal Computer, it was recognized that the operating system would be of utmost importance. Realizing that market acceptance was a primary goal, IBM chose a rather simple text oriented operating system which was suited for the level of hardware technology of the time. The operating system chosen was named DOS which is the acronym for disk operating system. The limited objectives for DOS at the time were non-cryptic commands, English language error messages (instead of error codes, small memory size (12 Kbyte) and reasonable performance. DOS served well for the Family I machines and even into the basic Family II models, but as memory and hardware prices declined and performance increased a more user friendly intuitive operating system was needed. Beginning in 1986, IBM started development of a graphical user interface (GUI) designed to mask the complexity of the hardware technology advances and present to the user an intuitive, flexible, and easy-to-use system. This operating system was named OS/2 and was developed for the more advanced technology of the Family II models.

Additionally, other manufactures have investigated and used other types of GUI systems. One of the earliest in the personal computing area was Xerox's STAR system that presented the user with icons representing a particular operation or software application. Later, APPLE's Macintosh system added features such as windows and drag and drop to further the intuitive nature of the graphical user interface for APPLE's line of computers. Presently, MICROSOFT's WINDOWS provides a graphical user interface on IBM compatible machines.

With GUI systems, the computer system is controlled using a pointing device such as a mouse. The pointing device controls the location of a pointer that appears on the screen of the computer's display device. Elements on the screen such as icons, which are graphical representations of various modules such as disk drives, applications and documents, or windows, which are rectangular areas on the screen in which applications or documents can be viewed, may be manipulated using the mouse. In this way, the underlying devices which the elements represent may be controlled.

As GUI systems developed, producing the underlying elements such as windows and icons has become well known. In fact, publicly available tools such as icon and window editors are now available to actually create the visual display. For example, Conklin, OS/2 Notebook, (Microsoft Press, 1990) pp. 159-255 discusses OS/2 software tools.

As new models of the personal computer family were introduced, OS/2 had to be updated and enhanced. One of the major features of the OS/2 Version 2.0 operating system in which the present invention is incorporated is a workplace shell featuring a desktop metaphor. Briefly, the desktop metaphor presents the user with the look of a desktop. For example, files can appear as icons grouped together into folders. Folders can be placed into a predefined space such as a window. Application programs appear as unique icons that can be activated when a pointer, positioned by the movement of a mouse over the icon, is energized usually by double clicking one of the mouse buttons.

Prior GUI systems such as IBM OS/2 Version 1.3 have employed cascade menus. When a cascade menu appears in the user's desktop on the screen, the user is presented with a main menu including a plurality of choices, each of the choices representing a basic function. For example, as seen in the screen representation depicted in FIG. 1, after double clicking on an icon such as folder icon 2, a main menu 4 appears within the window 6 on the computer screen. In this particular example, menu 4 includes such choices as the following basic functions "Open", "Help", "Create another" (folder), "Copy, Move", "Create shadow", "Delete" and "Find".

When the user selects the basic function Help from main menu 4, the Help function becomes highlighted and a cascaded submenu 8 automatically and unconditionally appears on the screen adjacent menu 4 as seen in FIG. 2. Submenu 8 is said to be cascaded with respect to main menu 4 in that it appears adjacent main menu 4 and depends logically therefrom. Submenu 8 includes a plurality of more advanced functions as compared with the basic functions of menu 4. The advanced functions of menu 8 are related to the particular basic function selected from menu 4 but provide the capability of selecting a particular type, variety, aspect or portion of the selected basic function. In this respect the functions of submenu 8 are subfunctions of the particular item of menu 4 which was selected by the user. For example, in the present example wherein the basic function Help was selected from menu 4, the submenu 8 may include the following more advanced subfunctions "Help index", "General help", "Using help" and "Keys help" as seen in FIG. 2.

The ready availability of such advanced functions is very desirable for more experienced GUI users. However, always exposing novice users to such advanced functions presents the novice user with unnecessary hurdles to overcome while learning and becoming productive with a particular GUI.

SUMMARY OF THE INVENTION

The present invention has been developed for the purpose of solving the above mentioned problems.

Accordingly, the invention has as one of its objects a means for shielding users from advanced operations in a graphical user interface.

Another objective of the present invention is to enhance the ease of use of a graphical user interface.

Yet another object of the present invention is to provided ready access to advanced functions for more experienced graphical user interface users.

In accordance with one embodiment of the invention, a method is provided for selecting a desired function in a computer system including the step of displaying, in a window on the computer system, a menu including a plurality of user selectable action items, each action item representing a basic function. The method also includes the step of displaying in the window at least one advanced function activator button adjacent one of the user selectable action items. The method further includes the step of determining if the action item or the adjacent advanced function activator button has been selected by the user. The method also includes the steps of performing the basic function represented by the action item if the action item has been selected by the user, and displaying an advanced function menu if the advanced function activator button has been selected by the user, the advanced function menu including a plurality of advanced function related to the basic function.

In another embodiment of the method of the present invention, a method is provided for selecting a desired function in a computer system including the step of displaying, in a window on a computer screen, a main menu including a plurality of action items. Each action item including a text command descriptive of a basic function, at least one of the action items including an advanced function push-button adjacent the basic function. The method also includes the step of selecting with a pointing device either the text command or an advanced function push-button of one of the action items. The method further includes the step of determining if a text command or an advanced function push-button of a particular action item is selected. The method also includes the step of performing a function corresponding to the text command if the text command is selected. The method still further includes the step of displaying an advanced function menu in the window in cascade relationship with the main menu if it is determined that an advanced function push-button was selected, the advanced function menu including a plurality of action items corresponding to respective advanced functions related to the basic function in the selected main menu action item.

BRIEF DESCRIPTION OF THE DRAWINGS

The foreground aspects and other features of the present invention are explained in the following written description, taken in connection with the accompanying drawings, wherein:

FIG. 4 shows a system block diagram for the personal computer system of FIG. 2.

FIG. 11 is a flowchart depicting the operation of the method and apparatus of the present invention.

DESCRIPTION OF A PREFERRED EMBODIMENT

The following detailed description is of the best presently contemplated mode for carrying out the invention. This description is not to be taken in a limiting sense but is made merely for the purpose of illustrating the general principles of the invention since the scope of the invention is best defined by the appending claims.

I. Operation Of The Computer System—General

Figure 1:
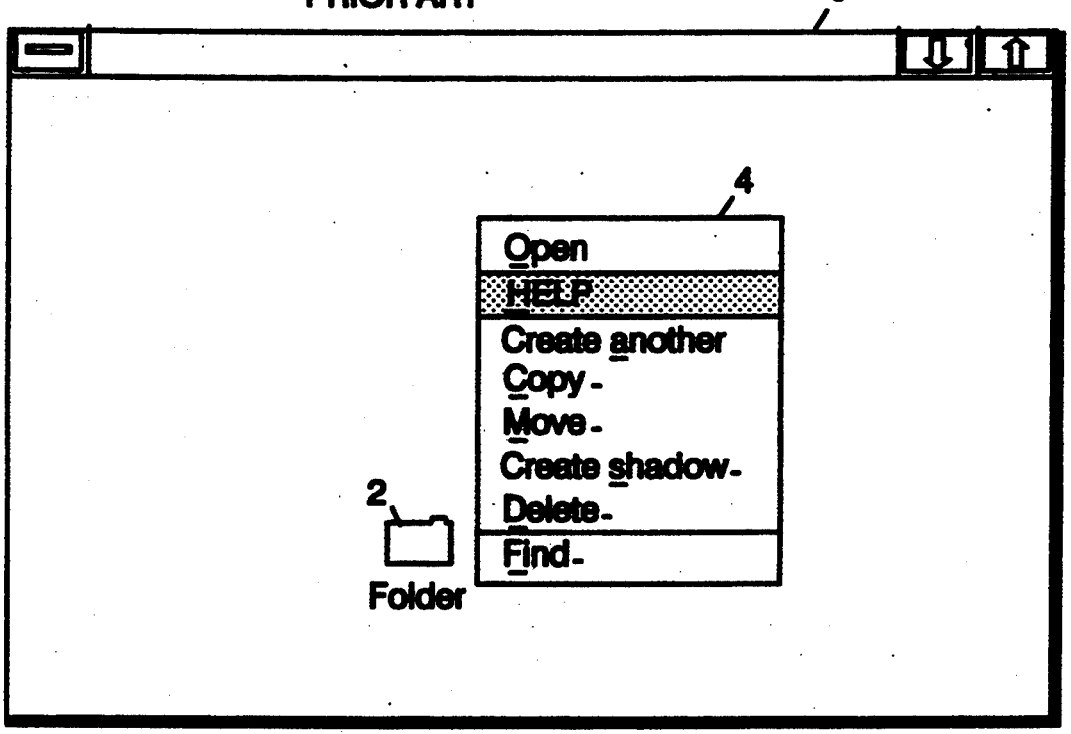
FIG. 1 is a screen representation of a typical main menu employed in a graphical user interface
Figure 2:
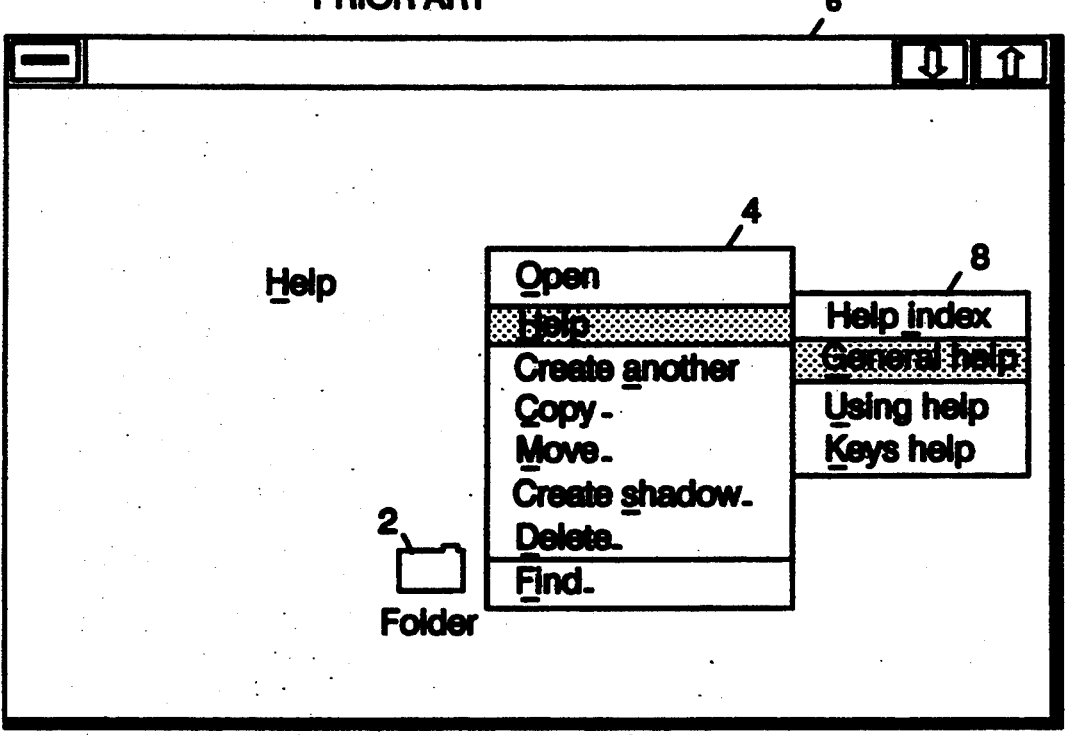
FIG. 2 is a screen representation of a submenu cascaded with respect to a main menu in a graphical user interface.
Figure 3:
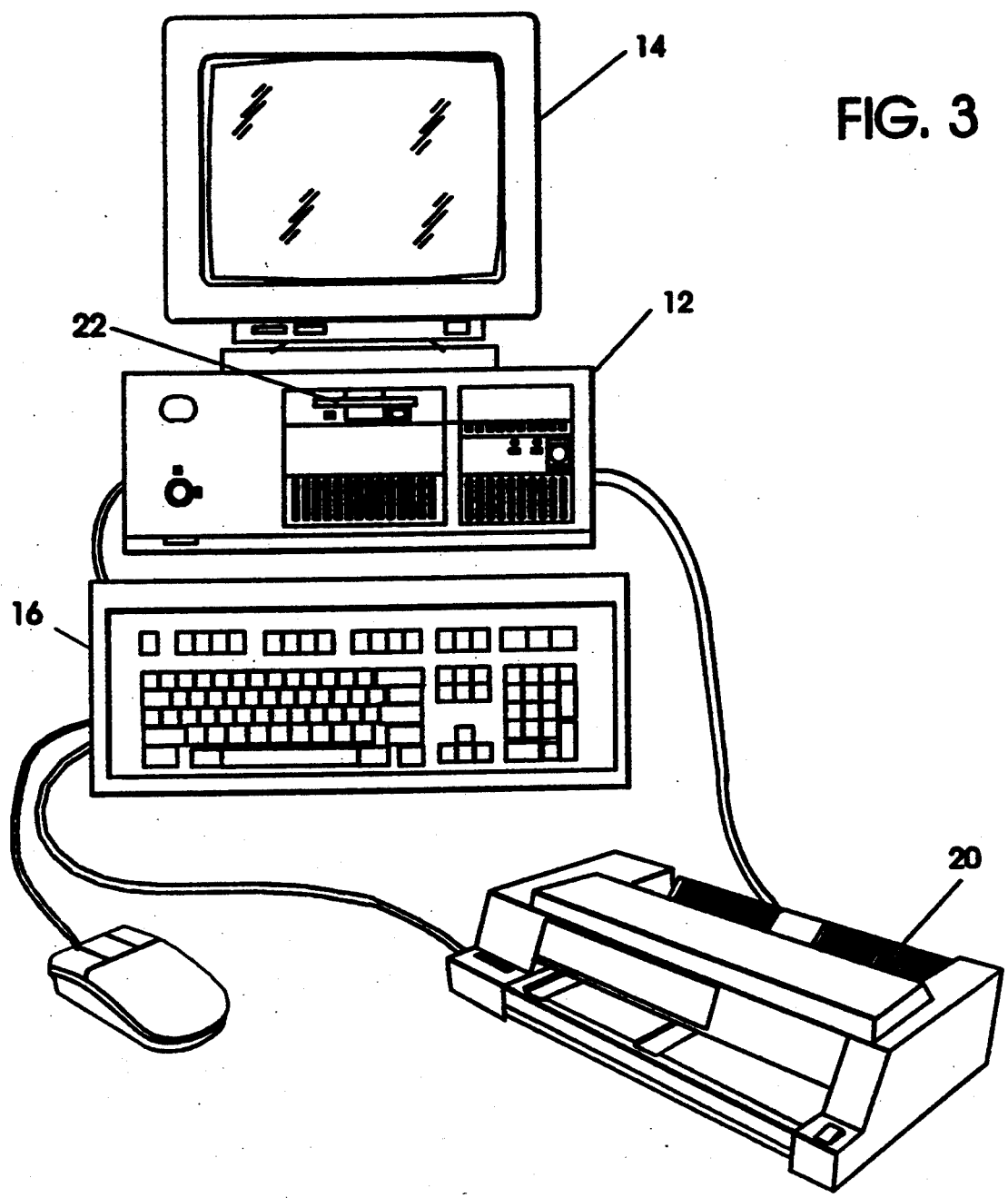
FIG. 3 shows a personal computer system in which the present invention can be employed.

Prior to relating the methodology and structure of the present invention, a summary of the operation in general of a typical personal computer system may merit review. Referring now to the drawings, and in particular to FIG. 3, there is shown a Personal Computer System 10 in which the present invention can be employed. As shown, the Personal Computer System 10 comprises a number of components which are interconnected together. More particularly, a system unit 12 is coupled to and can drive an optional monitor 14 (such as a conventional video display). A system unit 12 can also be optionally coupled to input devices such as a PC keyboard 16 or a mouse 18. Mouse 18 includes right and left buttons (not shown). The left button is generally employed as the main selector button and is alternatively referred to as the first mouse button or mouse button 1. The right button is typically employed to select auxiliary functions as explained later. The right mouse button is alternatively referred to as the second mouse button or mouse button 2. An optional output device such as a printer 20 can also be connected to the system unit 12. Finally the system unit 12 may include one or more mass storage devices such as the diskette drive 22.

As will be described below, the system unit 12 responds to input devices such as the PC keyboard 16, the mouse 18, or local area networking interfaces. Additionally, input/output devices, such as the diskette drive 22, display 14, printer 20, and local area network communication system are connected to the system unit 12 in a manner well known. Of course, those skilled in the art are aware that other conventional components can also be connected to the system unit 12 for interaction therewith. In accordance with the present invention, the computer system 10 includes a system processor that is interconnected to a random access memory (RAM), a read only memory (ROM), and a plurality of I/O devices.

In normal use, the personal computer system can be designed to give independent computing power to a small group of users as a server or a single user and is inexpensively priced for purchase by individuals or small businesses. In operation, the system processor functions under an operating system, such as IBM's OS/2 operating system or DOS. This type of operating system includes a BIOS interface between the I/O devices and the operating system. BIOS, which can be stored in a ROM on a motherboard or planar, includes diagnostic routines which are contained in a power on self test section referred to as POST.

II. Operation Of The Computer System—In More Detail

Prior to relating the above structure to the present invention, a summary of the operation in general of the Personal Computer System 10 may merit review. Referring to FIG. 4, there is shown a block diagram of the Personal Computer System 10 illustrating the various components of the Computer System 10 in accordance with the present invention. FIG. 4 further illustrates components of the planar 11 and the connection of the planar 11 to the I/O slots 46 and other hardware of the Personal Computer System 10. Connected to the planar 11 is the system processor 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used, one suitable microprocessor is the 80386 which is sold by Intel.

While the present invention is described hereinafter with particular reference to the system block diagram of FIG. 4, it is to be understood at the outset of the description which follows, it is contemplated that the apparatus and methods in accordance with the present invention may be used with other hardware configurations of the planar board. For example, the system processor could be an Intel 80286 or 80486 microprocessor. These particular microprocessors can operate in a real addressing mode or a protected addressing mode. Each mode provides an addressing scheme for accessing different areas of the microprocessor's memory.

Returning now to FIG. 4, the CPU local bus 24 (comprising data, address and control components) provides for the connection of a microprocessor 26, an optional math coprocessor 27, a cache controller 28, and a cache memory 30. Also coupled on the CPU local bus 24 is a buffer 32. The buffer 32 is itself connected to a slower speed (compared to the CPU local bus) system bus 34, also comprising address, data and control components. The system bus 34 extends between the buffer 32 and a further buffer 36. The system bus 34 is further connected to a bus control and timing unit 38 and a DMA unit 40. The DMA unit 40 is comprised of a central arbitration unit 48 and a DMA controller 41. The buffer 36 provides an interface between the system bus 34 and an optional feature bus such as the Micro Channel bus 44. Connected to the bus 44 are a plurality of I/O slots 46 for receiving Micro Channel adapter cards which may be further connected to an I/O device or memory. An arbitration control bus 42 couples the DMA controller 41 and central arbitration unit 48 to the I/O slots 46 and diskette adapter 82. Also connected to system bus 34 is a memory control unit 50 which is comprised of a memory controller 52, an address multiplexer 54, and a data buffer 56. The memory control unit 50 is further connected to a random access memory as represented by the RAM module 58. The memory controller 52 includes the logic for mapping addresses to and from the microprocessor 26 to particular areas of RAM 58. While the microcomputer system 10 is shown with a basic 1 megabyte RAM module, it is understood that additional memory can be interconnected as represented in FIG. 4 by the optional memory modules 60 through 64.

A further buffer 66 is coupled between the system bus 34 and a planar I/O bus 68. The planar I/O bus 68 includes address, data, and control components respectively. Coupled along the planar bus 68 are a variety of I/O adapters and other peripheral components such as the display adapter 70 (which is used to drive an optional display 14), a clock 72, nonvolatile RAM 74 (hereinafter referred to as NVRAM), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

The clock 72 is used for time of day calculations. NVRAM 74 is used to store system configuration data. That is, the NVRAM will contain values which describe the present configuration of the system. For example, NVRAM contains information which describe the capacity of a fixed disk or diskette, the type of display, the amount of memory, etc. Of particular importance, NVRAM will contain data which is used to describe the system console configuration; i.e. whether the PC keyboard is connected to the keyboard/mouse controller 84, a display controller is available or the ASCII terminal is connected to the RS232 adapter 76. Furthermore, these data are stored in NVRAM whenever a special configuration program is executed. The purpose of the configuration program is to store values characterizing the configuration of this system to NVRAM which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

III. OS/2 Version 2 Operating System—General

Figure 5:
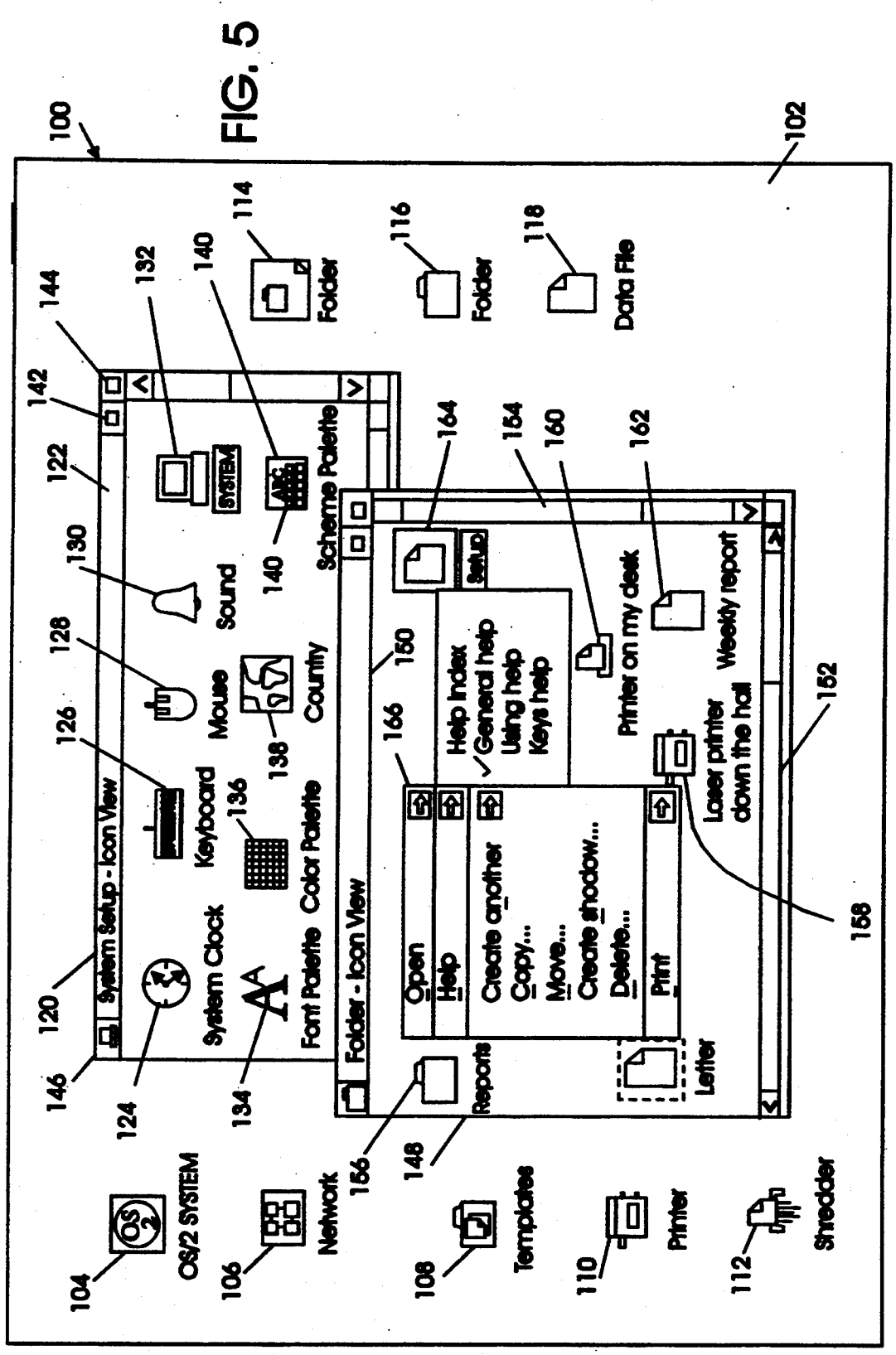
FIG. 5 is a screen representation of the desktop employed in the present invention.

It may be appropriate at this point to briefly review selected features of the OS/2 2.0 GUI. FIG. 5 illustrates a typical display screen 100 which appears when using OS/2 2.0. The viewing area within screen 100 is referred to as desktop 102. Desktop 102 includes a plurality of user selectable icons which are conveniently selected by double clicking the left button of the mouse. Each icon represents an application, function or file storage area which the user can select. For example, as seen in FIG. 5, desktop 102 includes an OS/2 System icon 104, a Network icon 106, a Templates icon 108, a Printer icon 110, a Shredder icon 112, a Folder icon 114, another Folder icon 116 and a Data file 118.

When the user selects an icon by double clicking the same, the corresponding function is activated and the icon becomes highlighted. For example, when the OS/2 System icon 104 is selected on desktop 102, OS/2 System icon 104 becomes highlighted as illustrated in FIG. 5. When OS/2 System icon 102 is so selected, a corresponding window 120 of further possible selections is displayed on desktop 102. More specifically, window 120 includes a title bar 122 in which the name of the selected window is designated in text as "System Setup—Icon View". In this particular example, the selectable icons appearing within System Startup window 120 includes a System Clock icon 124, a Keyboard icon 126, a Mouse icon 128, a Sound icon 130, a System icon 132, a Font Palette icon 134, a Color Palette icon 136, a Country icon 138 and Scheme Palette 140.

The upper right corner of window 120 includes a small box 142 which, if selected by the user, minimizes window 120, thus dismissing window 120 and returning window 120 to the icon 104 representation thereof. The upper right corner of window 120 also includes a box 144, larger than box 142 and which if selected by the user, maximizes window 120, thus causing window 120 to occupy substantially all of desktop 102.

The icon representation 146 appearing in the upper left corner indicates the type of window to which it corresponds. For example, window 120 is a system setup window; accordingly, the icon appearing in the upper left corner of window 120 is representative of the System icon. Had system clock icon 124 been selected, the icon appearing in the upper left corner of its window would be representative of a clock.

Since title bar 122 of window 120 is depicted in white or "not-highlighted", this indicates the window 120 is not presently selected or active. Rather the user has clicked on and selected Folder 114 as indicated by its highlighted nature. When Folder 114 was so selected, a corresponding Folder window 148 was opened on desktop 102 in overlapping fashion with respect to the earlier opened System Setup window 120. The title bar 150 of window 148 indicates the title of window 148 as being "Folder-Icon View". It is noted that title bar 150 of window 148 is highlighted, thus indicating that window 148 is presently the active window.

Window 148 includes a horizontal scroll bar 152 which can be engaged by the user to scroll through the contents of window 148 from left to right and from right to left all within the particular viewing area defined by the chosen dimensions of window 148. Window 148 also includes a vertical scroll bar for scrolling through the window contents vertically. Other windows generated by the operating system also include this feature. For purposes of example, window 148 includes a Reports icon 156, a Laser Printer Down The Hall icon 158, a Printer On My Desk icon 160, a Weekly Report icon 162 and a Status icon 164.

IV. Conditional Cascading Menus in OS/2 Version 2

When the user selects the word Open by clicking on the word "Open" in main menu 166, the function or application associated with the presently selected icon is launched.

Figure 6:
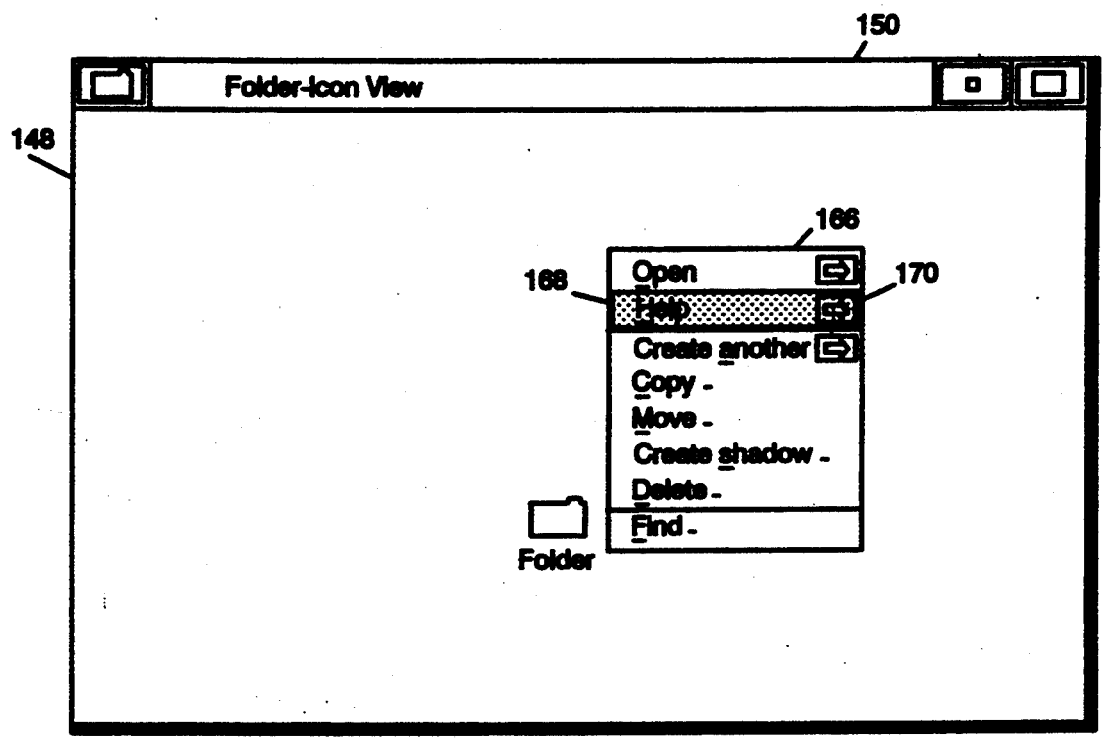
FIG. 6 is a screen representation of a main menu in accordance with the present invention.

One way to select and activate the function or application represented by a particular icon is to single click the right mouse button on that icon. This action causes a main menu such as menu 166 to appear on the screen. Initially, main menu 166 appears within window 148 without any associated cascaded submenus as illustrated in FIG. 6. For clarity, window 148 has been depicted in FIG. 6 without icons 156–164. Main menu 166 in this particular example includes such choices or action items as the following basic functions: "Open", "Help", "Create another" (folder), "Copy, Move", "Create shadow", "Delete" and "Find".

To illustrate the conditional cascading feature of the present invention, an example is now discussed wherein the user selects the basic Help function/action item 168 in main menu 166 of FIG. 6 by clicking on the "Help" text within action item 168 in menu 166. The "Help" action item 168 then becomes highlighted as indicated in FIG. 6 and the "Help" function is then launched.

A mini push-button 170 is located in the rightmost portion of the "Help" action item 168 in main menu 166. When the user clicks on the mini push-button 170, a cascaded "Help" submenu 172 appears adjacent main menu 166 as shown in FIG. 5 and in more detail in FIG. 7. The cascaded submenu 172 includes all forms of the selected basic function ("Help" in this case) as action items. More specifically, referring to FIG. 7, it is seen that the Help submenu 172 includes the following action items: Help Index, General Help, Using Help and Keys Help. It is thus seen that the functions of submenu 172 are subfunctions of the function associated with the selected action item of main menu 166. Stated alternatively, the subfunctions of submenu are advanced functions with respect to the more general function associated with the selected action item of main menu 166.

It is noted that a check mark appears adjacent the General Help action item in submenu 172. This indicates that General Help is the default action item of submenu 172. This means that when the user clicks on the Help text of the Help action item 168, the General Help subfunction is launched as a default. However, if the user clicks on the mini push-button 170 associated with action item 168, then the user is presented with submenu 172 which provides a listing of all forms of the basic action item, namely all forms of the Help function, as listed above. In this manner, a conditional cascade is provided wherein the cascaded submenu of subfunctions does not appear every time the selected main action item is invoked on the main menu, but rather the cascaded subfunction submenu is invoked conditionally when the user clicks on the mini push-button associated with the selected action item of the main menu.

Figure 7:
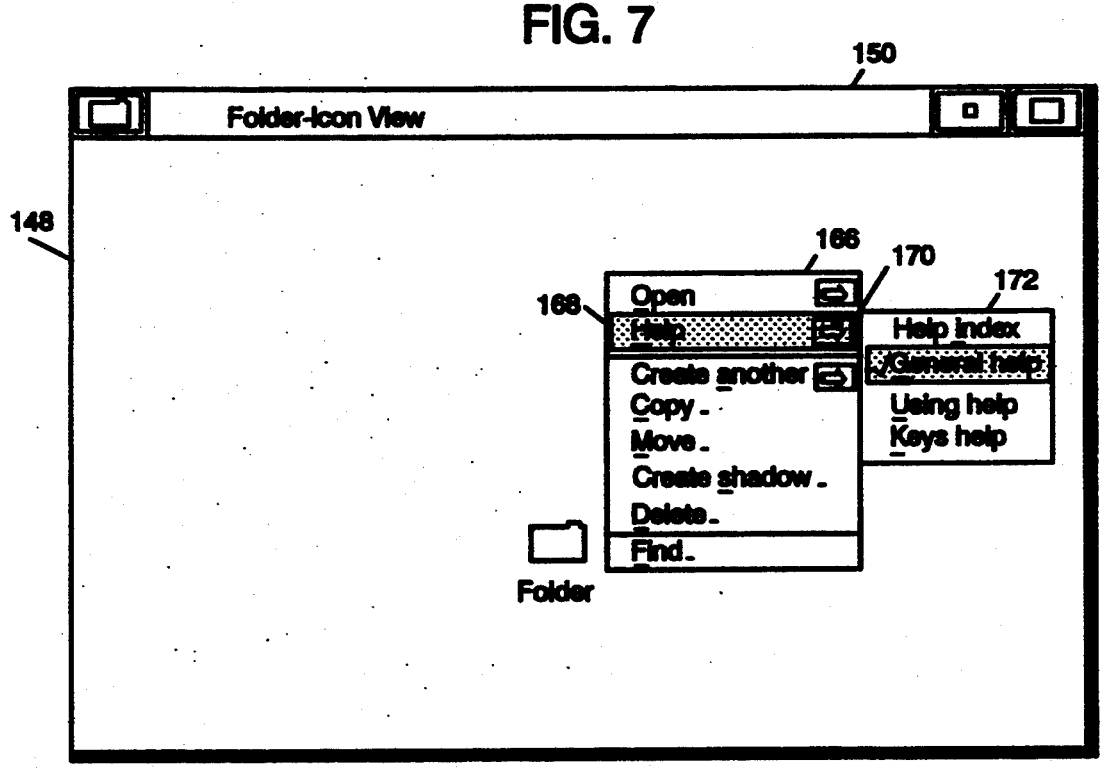
FIG. 7 is a screen representation of a conditionally cascaded window in accordance with the present invention.
Figure 8:
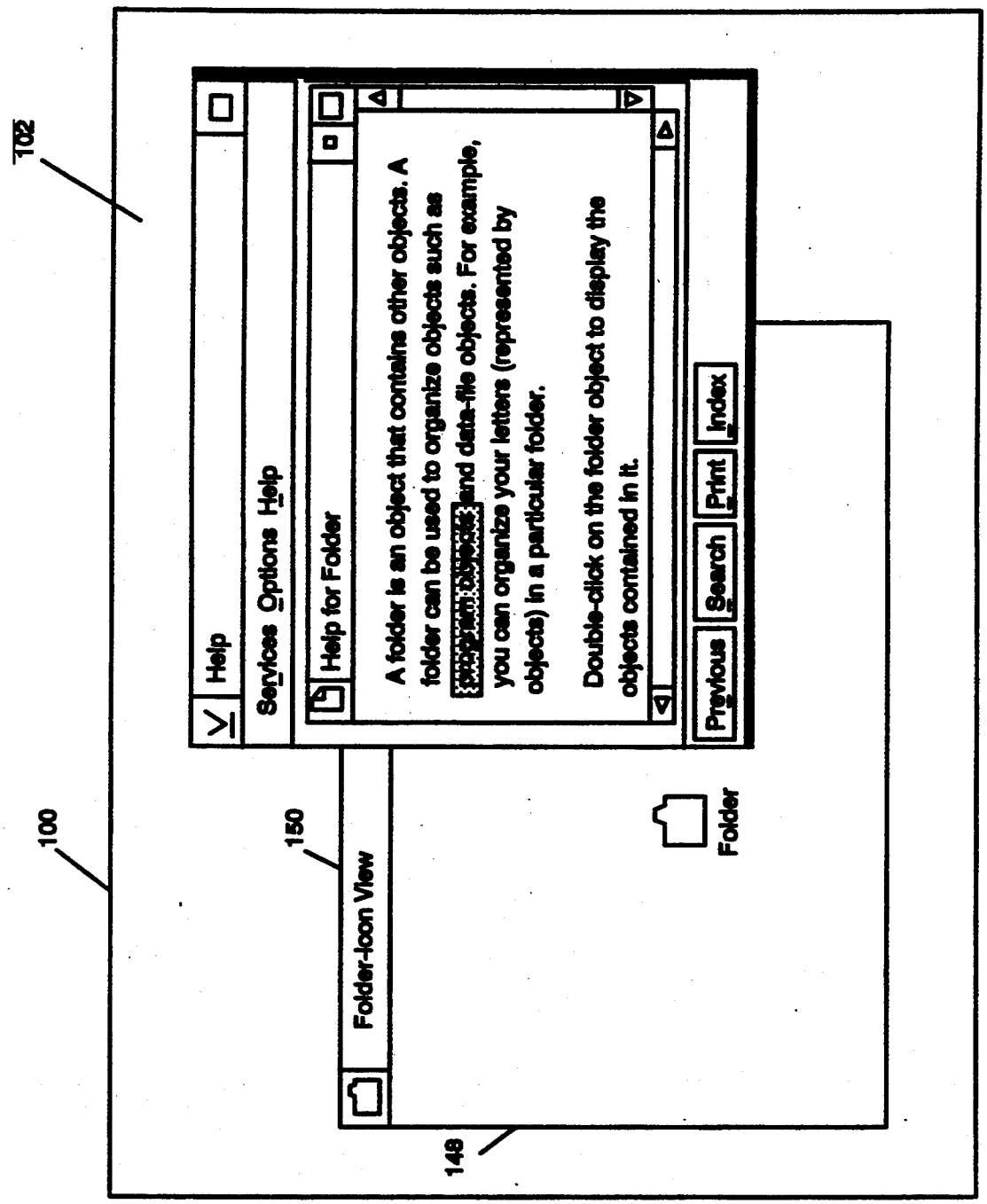
FIG. 8 is a screen representation of a subfunction window called from a conditionally cascaded submenu in accordance with the present invention.

When subfunction menu 172 is invoked, the user can select the particular type of help which is desired. For example, the user can click on the General Help item in submenu 172. This causes the General Help item to be highlighted as shown in FIG. 7. The General Help window is then displayed on desktop 102 as shown in FIG. 8. Returning again to FIG. 7, it is again noted that the check mark next to General Help in submenu 172 indicates that General Help is the default selection. In other words, when the user clicks on the Help text of the Help action item 168 of main menu 166, the General Help subfunction is launched. The default subfunction can however be changed to any of the action items of subfunction menu 172. To perform such a default change operation, the user accesses submenu 172 by clicking on mini-push button 170. Once submenu 172 appears, the user selects a particular subfunction and that selected subfunction then becomes the default subfunction which is invoked the next time the user selects the Help text of the Help action item 168. In other words, the most recently selected subfunction constitutes the default subfunction. The selected subfunction is provided with a check mark as shown in FIG. 7. Other options provided with respect to the default subfunction are that the default never changes and that the application itself can change the default.

Figure 9:
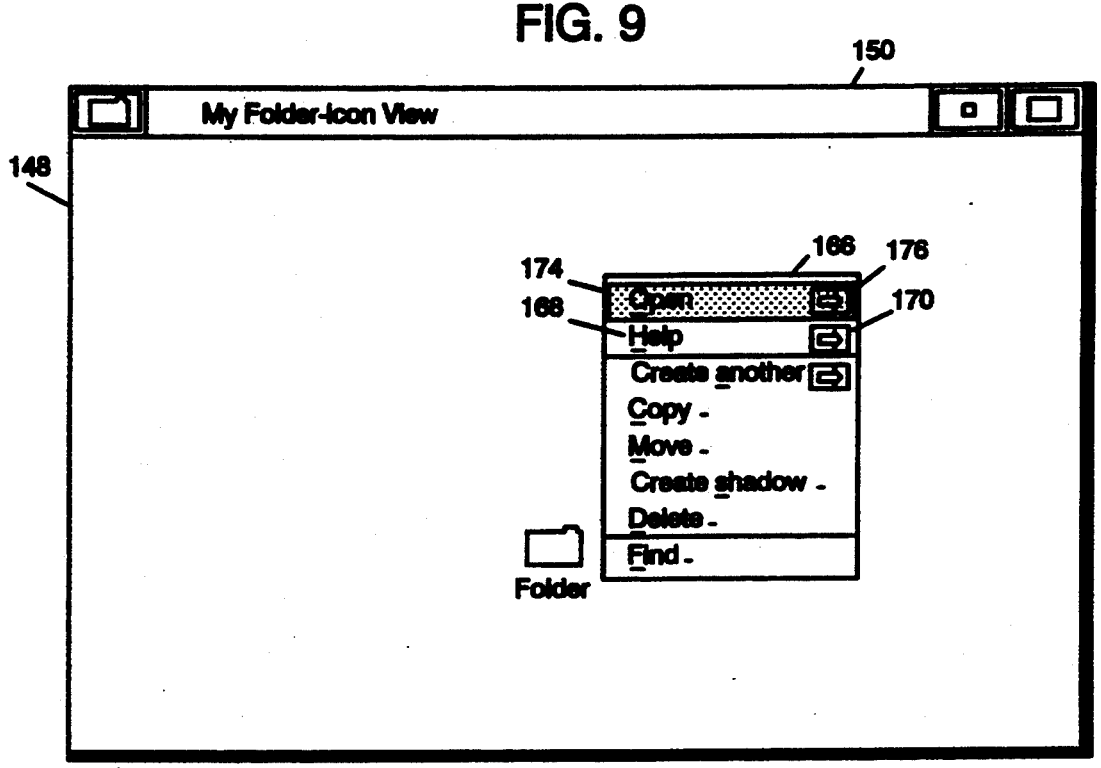
FIG. 9 is a screen representation of a main menu in accordance with the present invention.
Figure 10:
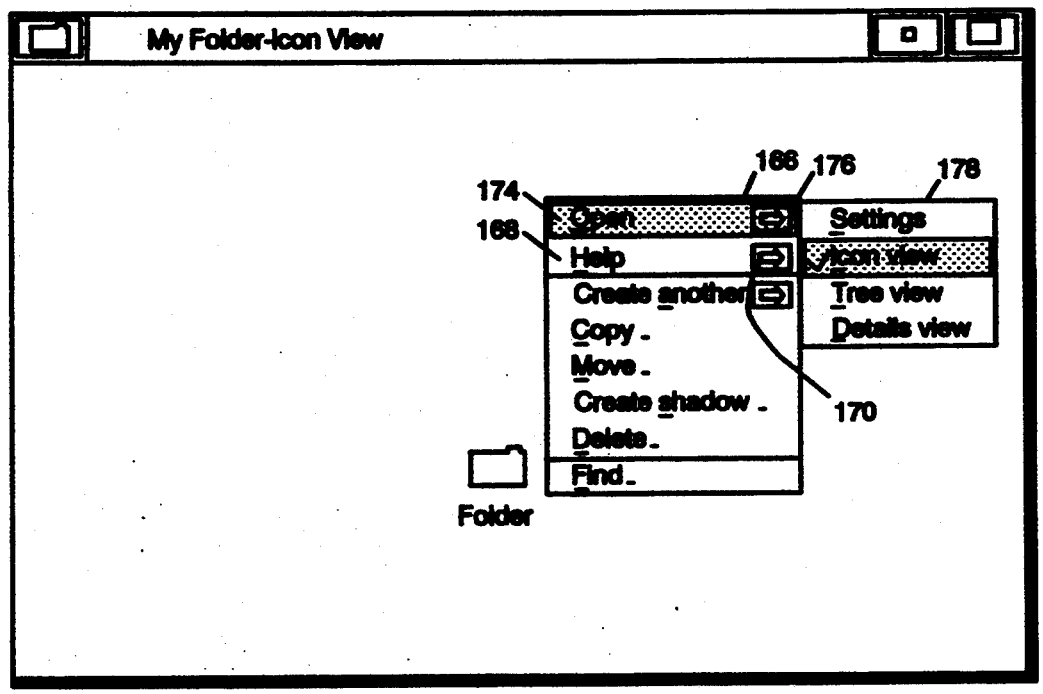
FIG. 10 is a screen representation of a conditionally cascaded window in accordance with the present invention.

FIG. 9 shows another example of a conditionally cascaded menu in accordance with the present invention. Main menu 166 in FIG. 9 is the same main menu that appeared in FIG. 6 discussed earlier. The difference here is that the user has selected the "Open" action item 174 and in so doing action item 174 becomes highlighted as seen in FIG. 9. Action item 174 includes a mini push-button 176 associated therewith. In a manner similar to the conditional cascaded Help function and subfunction menus discussed above, when the user selects the mini push-button associated with the Open main function, a submenu 178 of subfunctions appears adjacent main menu 166 in cascaded relationship therewith as depicted in FIG. 10. The subfunctions contained in submenu 178 are subfunctions related to the associated Open function in main menu 166. More specifically, submenu 178 includes the following action items as subfunctions: Settings, Icon View, Tree View and Details View. In this particular example, the default subfunction is Icon View as indicated by the check mark adjacent the Icon View action item in submenu 178. Thus, when the user performs an Open operation by clicking on the text of the Open action item 174, by default icon views will be generated when such Open operation is performed. The default subfunction may be changed in the manner described earlier.

A flowchart which depicts the operational flow of the conditional cascading method and apparatus of the present invention is depicted in FIG. 11. At the start of process flow a main menu is displayed as per block 201. This main menu of choices or action items is displayed either as a popup menu or as a pulldown menu, for example. In this particular embodiment of the invention, a popup menu will be displayed for any object when the user clicks on the object with the second mouse button. The user positions the pointer or cursor using the mouse and selects one of the aforementioned main menu items as per block 202. More specifically, an item is selected by clicking with mouse button 1 or by using a keyboard action of either Esc, Enter, or a mnemonic.

To access the conditional cascade menu, the user clicks with mouse button 1 on the mini push-button next to the text of the menu action item. To access the conditional cascade menu with the keyboard, the user presses the right arrow key on the keyboard. The conditional cascade menu is dismissed in the same manner in which conventional cascades are dismissed, namely, pressing either the Esc key or left arrow key, or by changing the focus to another window.

A test is made at block 203 to determine if the conditional cascade mini push-button was selected. If it is determined that the user did not select the conditional cascade mini push-button, then the computer dismisses or erases the main menu from the desktop as per block 204. A test is then made to determine if a main menu item was selected as per block 205. Either a main menu item was selected, or the menu was dismissed due to one of the mouse or keyboard actions described in conjunction with blocks 202, 203 and 204 above. If the menu was dismissed then the operation is complete. Otherwise the basic action was selected and the conditional cascade is never displayed and the processing continues with block 206.

If it is determined that no menu item was selected then the operation is complete and the operation stops as shown in FIG. 11. However, if it is determined that a main menu items was selected by the user, then the computer peforms the default action in the cascaded submenu as indicated at block 206 and as described earlier. The default action is initially defined by the application but can be modified by the user as indicated later in the discussion of this flowchart. The default action appears in the conditional cascade menu and is denoted by a checkmark preceding the menu item name. Once the default action is performed by the computer, the operation is complete and the computer waits for further instructions from the user.

If a determination was made at decision block 203 that the conditional cascade mini push-button was selected, then the condition cascade submenu of action items is displayed as per block 207. All of the available varieties of the selected basic function of the main menu are listed in the conditional cascade menu and default action is displayed with a checkmark to the left of the menu item name. It is again noted that the default action item is initially defined by the application but can be modified by the user.

Once the cascade submenu is displayed on the desktop adjacent main menu to which it relates, the user positions the pointer using the mouse and makes a selection of one of the cascade submenu items as per block 208. If the user desires to take no actions in the cascade submenu, the user can dismiss the submenu by pressing the Esc key or the left arrow key, or by changing the focus to another window (ie. click on another window).

With the cascade submenu displayed, a submenu item is selected by clicking the desired item with mouse button 1 or by using a keyboard action of either Esc, Enter or a mnemonic. The conditional cascade menu is then dismissed as per block 209. A determination is then made at decision block 210 as to whether a submenu item has been selected or has not been selected. Either a submenu item was selected or the submenu was dismissed by one of the mouse or keyboard actions discussed earlier. If in decision block 210 it is determined that a submenu item was not selected, then flow continues back to block 202 at which the user can position the pointer and make a selection. However, if a submenu item has been selected then flow continues to decision block 211 at which a determination as to whether or not the submenu has an automatic default change style. Decision block 211 determines if the default action has changed. If the user in selecting a particular action item from the cascade submenu has not changed the default action item, then flow continues to block 212 at which the cascade submenu and the main menu are dismissed. The selected submenu action item is then performed as per block 213. In other words, the selected variety of the basic function is performed and processing of this operation then stops as indicated in FIG. 11.

The selected function may or may not be the same as the default action, depending upon whether or not the selected action had a default checkmark next to it. If it is determined in decision block 211 that the presently selected submenu item is different from the old default submenu item then flow continues to block 214 at which the checkmark is moved from the old default action item to the presently selected action item which then becomes the default action item.

In accordance with the invention, the submenu has a style (application set behavior) that permits the default action to dynamically change according to the last selected action item in the submenu. In other words, the present default action in the submenu is the submenu item which was set the last time that the submenu was accessed by the user. Thus, if decision block 211 determines that a change in style, that is, a selection of a particular submenu action item different from the one last selected by the user (the present default), then the checkmark is moved to the presently selected submenu action item which now constitutes the present default as per block 214. After the checkmark is changed in block 214 flow then continues to block 212 at which the main menu and the cascaded submenu are dismissed. The selected submenu action is then performed by the computer at block 213 and processing of this conditional cascade submenu operation then stops.

The foregoing has described a conditional cascading menuing method and apparatus which shields novice users from being overwhelmed by advanced operations. The conditional cascading feature provides the user with the ability to select a basic function or action, in which case the default behavior of the function will be performed, or to conditionally display, by pressing a mini push-button next to the main menu item text, a submenu of all forms of function or action. The default submenu behavior or item is indicated by a checkmark adjacent the default item in the submenu. Each time the user selects a submenu item which is different from the default submenu item, the presently selected submenu item becomes the default item or behavior.

While the invention has been illustrated in connection with a preferred embodiment, it should be understood that many variations will occur to those of ordinary skill in the art, and that the scope of the invention is defined only by the claims appended hereto and equivalent.

We claim:

1. A method for selecting a desired function in a computer system which includes a display screen, said method comprising the steps of:
    displaying, in a window on said display screen, a menu including a plurality of user selectable action items, each of said user selectable action items representing a basic function;
    displaying in said window at least one advanced function activator button adjacent a selected one of said user selectable action items;
    determining if said selected one of said plurality of user selectable action items or said at least one advanced function activator button displayed adjacent thereto has been selected by a user;
    performing said basic function represented by said selected one of said plurality of user selectable action items if said selected one of said plurality of user selectable action items has been selected by said user; and
    displaying an advanced function menu if said at least one advanced function activator button displayed adjacent to said selected one of said plurality of user selectable action items has been selected by said user, said advanced function menu including a plurality of advanced functions related to said basic function.

2. The method according to claim 1, further including the step of performing a particular advance function selected by said user if said at least one advanced function activator button displayed adjacent to said selected one of said plurality of user selectable action items is selected by said user and said user selects said particular advanced function.

3. A method for selecting a desired function in a computer system which includes a display screen, said method comprising the steps of:
    displaying, in a window on said computer screen, a main menu including a plurality of action items, each action item including a text command descriptive of a basic function, at least one of said plurality of action items including an advanced function push-button displayed adjacent to said text command descriptive of a basic function;
    selecting with a pointing device either said text command descriptive of a basic function or said advanced function push-button displayed adjacent thereto;
    determining if said text command descriptive of a basic function or said advanced function push-button displayed adjacent thereto has been selected;
    performing a function corresponding to said text command descriptive of a basic function if said text command descriptive of a basic function has been selected; and
    displaying an advanced function menu in said window in cascade relationship in said main menu in response to a determination that said advanced function push-button displayed adjacent to said text command descriptive of a basic function has been selected, said advanced function menu including a plurality of action items corresponding to advanced functions related to said basic function described by said text command.

4. The method according to claim 3, further comprising the step of indicating one of said action items within said advanced function menu as a default action item.

5. The method according to claim 4, further comprising the step of performing said default action item of said advanced function menu in response to selection of said text command descriptive of said basic function.

6. A system for selecting a desired function within a computer having a display screen, said system comprising:

means for displaying, in a window on said display screen, a main menu including a plurality of action items, each action item including a text command descriptive of a basic function, at least one of said plurality of action items including an advanced function push-button displayed adjacent to said text command descriptive of a basic function;

means for selecting with a pointing device either said text command descriptive of a basic function or said advanced function push-button displayed adjacent thereto;

means for determining if said text command descriptive of a basic function or said advanced function push-button displayed adjacent thereto has been selected;

means for performing a function corresponding to said text command descriptive of a basic function if said text command descriptive of a basic function has been selected; and means for displaying an advanced function menu in said window in cascade relationship in said main menu in response to a determination that said advanced function push-button displayed adjacent to said text command descriptive of a basic function has been selected, said advanced function menu including a plurality of action items corresponding to advanced functions related to said basic function described by said text command descriptive of a basic function.

* * * * *